(12) United States Patent
Sharma et al.

(10) Patent No.: US 11,877,050 B2
(45) Date of Patent: Jan. 16, 2024

(54) USER INTERFACE FOR IMAGE CAPTURE

(71) Applicant: QUALCOMM Incorporated, San Diego, CA (US)

(72) Inventors: Akshay Sharma, Hyderabad (IN); Sudheer Reddy Kesani, Hyderabad (IN); Sai Krishna Bodapati, Vijaywada (IN)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/648,523

(22) Filed: Jan. 20, 2022

(65) Prior Publication Data
US 2023/0232094 A1    Jul. 20, 2023

(51) Int. Cl.
*H04N 23/63* (2023.01)
*G06V 10/74* (2022.01)
*G06V 40/20* (2022.01)
*H04N 23/80* (2023.01)
*H04N 5/265* (2006.01)
*H04N 5/76* (2006.01)

(52) U.S. Cl.
CPC .......... *H04N 23/633* (2023.01); *G06V 10/74* (2022.01); *G06V 40/20* (2022.01); *H04N 5/265* (2013.01); *H04N 5/76* (2013.01); *H04N 23/632* (2023.01); *H04N 23/80* (2023.01)

(58) Field of Classification Search
CPC ........ H04N 23/633; H04N 5/265; H04N 5/76; H04N 23/632; H04N 23/80; G06V 10/74; G06V 40/20
See application file for complete search history.

(56) References Cited

U.S. PATENT DOCUMENTS

| 2006/0078312 | A1 | 4/2006 | Murata et al. |
| 2013/0071031 | A1 | 3/2013 | Huang et al. |
| 2013/0314566 | A1* | 11/2013 | Walker ............... H04N 5/77 348/231.3 |

(Continued)

FOREIGN PATENT DOCUMENTS

| CN | 112367466 A | 2/2021 |
| WO | WO-2014130843 A1 | 8/2014 |

(Continued)

OTHER PUBLICATIONS

International Search Report and Written Opinion—PCT/US2023/060578—ISA/EPO—dated Apr. 24, 2023 (2107352WO).

*Primary Examiner* — Christopher K Peterson
(74) *Attorney, Agent, or Firm* — QUALCOMM Incorporated

(57) ABSTRACT

The present disclosure provides systems, apparatus, methods, and computer-readable media that support linking paused video recordings captured over a period of time. In a first aspect, a method of image processing may include determining a match between first image data and second image data; presenting an indication to a user of the match; receiving user input responsive to the indication; and based on determining the match and the user input indicating to combine the first image data and the second image data, determining output image data comprising at least some of the first image data and at least some of the second image data. Other aspects and features are also claimed and described.

25 Claims, 6 Drawing Sheets

(56) References Cited

U.S. PATENT DOCUMENTS

| | | |
|---|---|---|
| 2015/0318020 A1 | 11/2015 | Pribula |
| 2016/0019426 A1 | 1/2016 | Tusch et al. |
| 2021/0004589 A1 | 1/2021 | Turkelson et al. |
| 2021/0392272 A1* | 12/2021 | Yedvab .................. G06F 1/1626 |
| 2022/0405898 A1* | 12/2022 | Dolgin .................... G06T 5/002 |

FOREIGN PATENT DOCUMENTS

| | | |
|---|---|---|
| WO | WO-2018011682 A1 | 1/2018 |
| WO | WO-2018126279 A1 | 7/2018 |

* cited by examiner

USER INTERFACE FOR IMAGE CAPTURE

TECHNICAL FIELD

Aspects of the present disclosure relate generally to image capture. Some features may enable and provide improved interface for capturing images.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Sharing of digital videos captured by an image capture device, such as videos of a user's experiences in life, allows a user to stay in touch with many friends and family across large distances. The sharing of such videos also allows others to experience what the user has experienced. Such sharing may be personally enjoyable and/or used for marketing purposes.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, video sharing and other video uses may be supported using a pause feature for a video that allows the video recording to be resumed at a later time based on matching features of stored videos with new image frames. Artificial intelligence may be used to identify matches with sufficient confidence levels (e.g., above a threshold confidence level). Matched videos may be used to extend the paused video, and when the paused video is completed, export a compressed and/or encoded video file.

In one aspect of the disclosure, a method for image processing includes determining a match between first image data and second image data; presenting an indication to a user of the match; receiving user input responsive to the indication; and based on determining the match and the user input indicating to combine the first image data and the second image data, determining output image data comprising at least some of the first image data and at least some of the second image data. The first image data and second image data may be image data, such as a photograph or a video sequence of a series of image frames. The image data may be obtained from a camera of the image capture device and/or other sources, such as cloud storage, text messages, local storage, Internet sources, remote video feeds (e.g., RTSP streams), or the like. Thus, in one embodiment, the matching identifies a match of current image data recording to previously-recorded image data recorded by the same local storage device and stored in a buffer and/or a storage device. In another embodiment, the matching identifies a match of a current image data to a previously-recorded image received from another wireless device, such as through an attachment to a text message (e.g., MMS and/or RCS chat message).

In an additional aspect of the disclosure, an apparatus, such as an image capture device, includes at least one processor and a memory coupled to the at least one processor. The at least one processor is configured to perform operations including determining a match between first image data and second image data; presenting an indication to a user of the match; receiving user input responsive to the indication; and based on determining the match and the user input indicating to combine the first image data and the second image data, determining output image data comprising at least some of the first image data and at least some of the second image data.

In an additional aspect of the disclosure, an apparatus includes means for determining a match between first image data and second image data; means for presenting an indication to a user of the match; means for receiving user input responsive to the indication; and means for, based on determining the match and the user input indicating to combine the first image data and the second image data, determining output image data comprising at least some of the first image data and at least some of the second image data.

In an additional aspect of the disclosure, a non-transitory computer-readable medium stores instructions that, when executed by a processor, cause the processor to perform operations. The operations include determining a match between first image data and second image data; presenting an indication to a user of the match; receiving user input responsive to the indication; and/or based on determining the match and the user input indicating to combine the first image data and the second image data, determining output image data comprising at least some of the first image data and at least some of the second image data.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video. The video may include other image frames received from the image sensor or other images sensors and/or other corrected image frames based on input from the image sensor or another image sensor. In some embodiments, the processing of one or more image frames may be performed within the image sensor. The image processing techniques described in embodiments disclosed herein may be performed by circuitry in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor or corrected image frames processed by one or more algorithms within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction described in various embodiments herein, the output frame may be displayed on a device display as a single still image and/or as part of a video, saved to a storage device as a picture or a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have improved appearance in low-light conditions.

In some aspects, the corrected image frame may be produced by combining aspects of the image correction of this disclosure with other computational photography techniques such as high dynamic range (HDR) photography or multi-frame noise reduction (MFNR). With HDR photography, the first image frame and a second image frame are captured using different exposure times, different apertures, different lenses, and/or different other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the image correction or otherwise controlling aspects of the image correction, such as by determining when to apply deblurring, applying a deblurring operation to a blurry object, and/or controlling a zoom level of a resulting image. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The methods described herein may be embedded in a computer-readable medium as computer program code comprising instructions that cause a processor to perform the operations of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may execute instructions of the computer-readable medium that cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
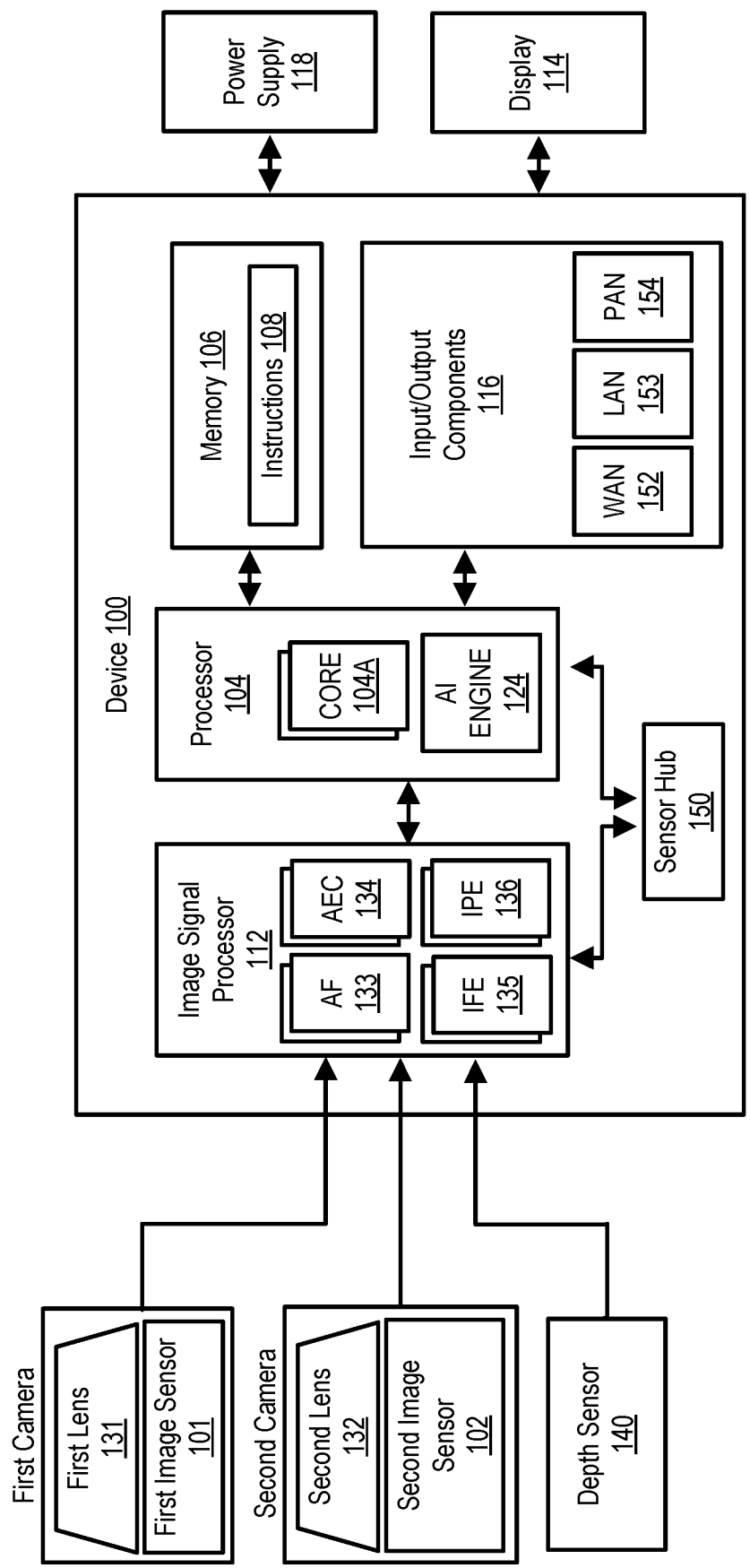
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that provide a user interface for supporting image capture and linking between captured images and/or videos. In one example, different image capture sessions may be matched based an indicator of the content or an indication in the content. A user may use such systems, apparatus, methods, and computer-readable media for effectively pausing a video recording and continuing the video recording over multiple image capture sessions without requiring the user to manually specify the linking between sessions. For example, the disclosure provides systems, apparatus, methods, and computer-readable media that support image processing to allow a user to record a first video and pause the video recording to be continued at a later time. A linked snapshot may be used to match image data for a video recording or a preview image to a video that was previously-paused. When a match is identified between a video or a current scene of the image sensor and a previously-paused video, the user may be prompted with the match and allowed to sue the current video to continue the previously-paused video.

Particular implementations of the subject matter described in this disclosure may be implemented to realize one or more of the following potential advantages or benefits. In some aspects, the present disclosure provides techniques for improving the relevance of a photograph and/or a video. For example, the matching of videos to previously-recorded videos may allow an automated combination of relevant videos to generate, e.g., a journey through one year of life or a first year of marriage. Using the newborn baby journal as an example, a photo of the baby's related stuff may be used as a snapshot to link videos together. Aspects of the invention may benefit users, such as travelers, vloggers, youtubers, and/or videography lovers.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end (AFE) or other circuitry for converting analog signals to digital representations (e.g., an analog-to-digital converter (ADC)) for the image frame, which may be further processed in digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include transceiver(s) and baseband processor(s), may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver. The image signal processor 112 may also receive contextual information regarding movement of the device 100 from the processor 104, such as an indication regarding active applications or services executing on the processor 104. For example, an indication of an active run tracking application may indicate the motion of the device 100 is a running activity.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different fields of view to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, may be embodied as software code executed by the ISP 112, and/or may be a combination of hardware and software.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 having one or more circuits configured for executing machine learning (ML) algorithms) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The image capture device 100 may be used to record videos by capturing changes in a scene over a period of time, such as ten seconds, thirty seconds, three minutes, or thirty minutes. This video is recorded as one or a series of image frames occurring in sequential time one after the other. The recording continues until a user stops the recording, after which the video is saved as a file in the image capture device 100, such as in a non-volatile memory, by encoding the image frames into an appropriate format. Past image capture sessions (including one or more image frames and/or videos) may be made available in a gallery application that displays previously captured videos and photographs. A user may desire to add content to a previously-captured video after a long duration, such that image frames are not all consecutive in time. For example, a user may desire to record a video that captures a short portion, such as thirty seconds, each day over a longer period of time, such as a year. The video recording may be stopped and started as a new file each day over the period of time. However, this may be inconvenient for a user in that the user must later use software to combine these separate videos into an output video.

The user may be stop the recording, and when a later image capture session captures related content, the user may be provided an option to effectively continue the video recording at the future time. This option may be supported by an image matching capability, in which similarities are identified between a current scene and a previously-paused video recording. When a similarity is detected, the user may be prompted with an option to append to an earlier video recording and continue the video recording. The appending may include linking files together, such as in a playlist, and/or merging content into a single file.

Figure 2:
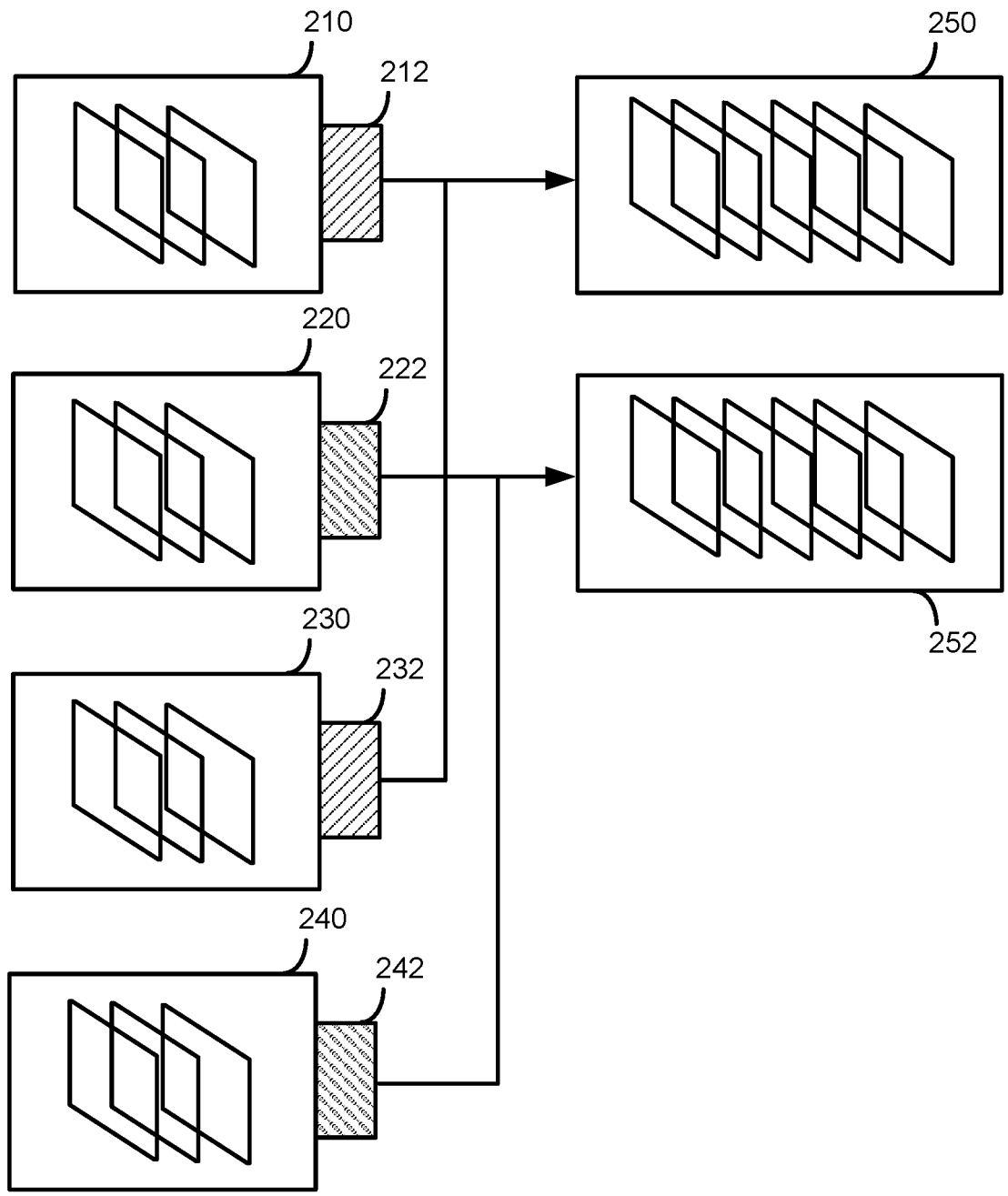
FIG. 2 shows a block diagram illustrating video matching using snapshots according to some embodiments of the disclosure.

One example of pausing and linking videos is shown in FIG. 2. FIG. 2 shows a block diagram illustrating video matching using snapshots according to some embodiments of the disclosure. Several videos 210, 220, 230, and 240 may be stored in memory, such as a buffer. Each of the videos 210, 220, 230, and 240 may have an accompanying snapshot 212, 222, 232, and 242, respectively. In some embodiments, the snapshot 212, 222, 232, and 242 may be the last image frame in the series of image frames that make up the videos 210, 220, 230, and 240. The snapshots 212, 222, 232, and 242 may be analyzed for similarity and matches identified for combining some of the videos 210, 220, 230, and 240. Other aspects of the videos 210, 220, 230, and 240 may likewise be used in determining matches. For example, the snapshot 212 corresponding to video 210 may be compared against a first image frame of each of the videos 220, 230, and 240 to determine matching videos. As another example, the snapshot 212 corresponding to video 210 may be compared against multiple image frames in each of the videos 220, 230, and 240 to determine matching videos. Video matching may be performed on the basis of image recognition, such as face recognition, to match scenes. Video matching may also or alternatively be performed on the basis of detecting a particular scene, such as by filming the user's hand at the end of video 210 such that a certain hand symbol (e.g., hand with outstretched fingers) appears in the snapshot 212.

In the example of FIG. 2, snapshot 212 matches snapshot 222 indicating the video 220 is a continuation of paused (e.g., previously-recorded) video 210. Likewise, snapshot 222 matches snapshot 242 indicating the video 220 is a continuation of paused video 240. The user may be prompted when recording video 230, such as at the beginning of video 230, that a match is identified for paused video 210 and the user prompted with an option to continue recording for paused video 210. In some embodiments, the paused video 210 may be automatically unpaused (e.g., without user input) when a match between video 230 and snapshot 212 is determined.

The snapshot 212 may include a symbol, gesture, object, or scene that is predefined to indicate a video pausing command. One example of a gesture is a user's open hand in the foreground of an image frame. When detected at the end of the video, such a gesture may indicate that the user is pausing the video, rather than ending the video. When the gesture is detected at a later time, the device may determine a match between the paused video and the current image frames and record additional video as a continuation of the paused video. Matched videos may be combined to determine an output video that includes the some or all images frames from the matched videos. Output video 250 may include image frames from video 210 and video 230 based on matching video 230 with a snapshot 212 corresponding to video 210. Output video 252 may include image frames from video 220 and video 240 based on matching video 240 with a snapshot 222 corresponding to video 220. Snapshot 212 may be distinct from snapshot 222 such that output video 250 is determined to not include video 220. For example, snapshot 212 may be a user's hand with one finger extended and snapshot 222 may be a user's hand with two fingers extended. As another example, snapshot 212 may have a first recognized face and snapshot 222 may have a different, second recognized face. In some embodiments, the combining of videos may involve processing when forming output videos 250 and/or 252, such as to scale video resolutions of the paused videos 210, 220, 230, and/or 240 to have similar or same resolution as other paused videos being combined.

The output videos 250 and/or 252 may be further processed after combining image frames from matched videos. In some embodiments, the output videos 250 and/or 252 may be encoded, such as by compressing, the image frames to reduce the image size. In some embodiments, the output videos 250 and/or 252 may have audio processed to normalize audio levels between combined videos. In some embodiments, the output videos 250 and/or 252 may have video processed to normalize a brightness or gamma level between combined videos.

Figure 3:
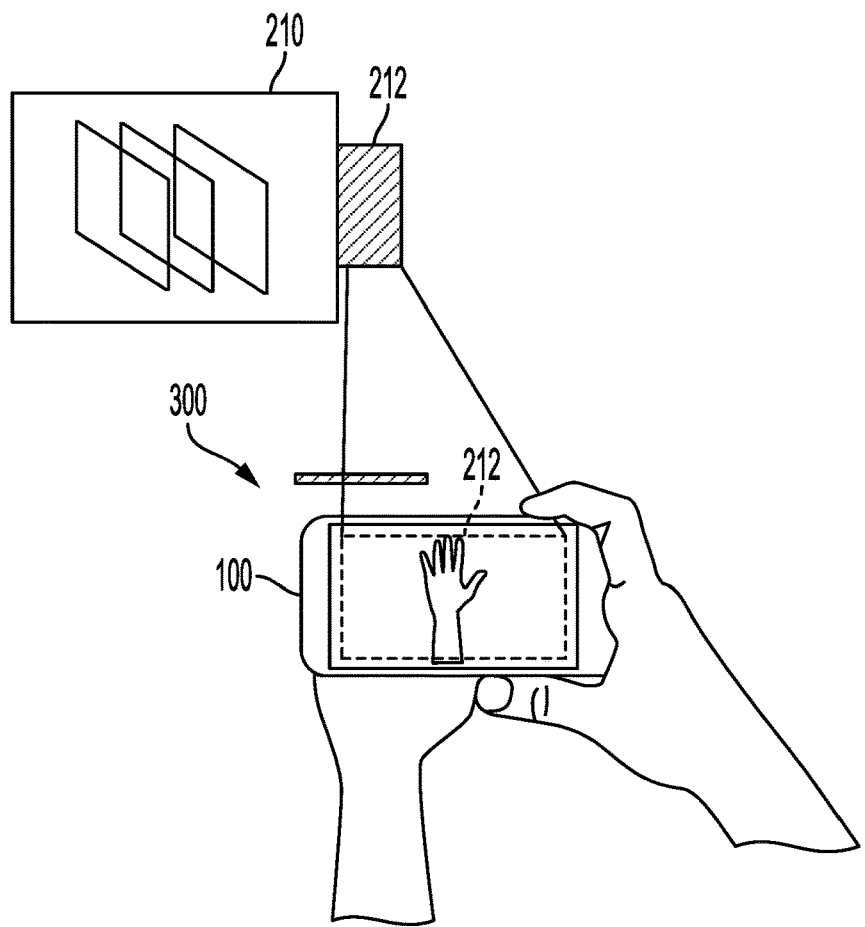
FIG. 3 is an illustration of detecting a pause command and acquiring a snapshot for video matching according to some embodiments of the disclosure.

Paused videos 210, 220, 230, and/or 240 may be recorded and paused based on user input. The user input to pause the video may be the user presenting a specific object or scene to the camera. One example is shown in FIG. 3. FIG. 3 is an illustration of detecting a pause command and acquiring a snapshot for video matching according to some embodiments of the disclosure. A user may place a "stop" hand symbol in the camera's view, which causes 300 the image capture device 100 to capture snapshot 212 of the scene at the pause time. The device 100 stores the image frames captured during a video recording up to the time of receiving the user input as a paused video 210 with linked snapshot 212.

Figure 4:
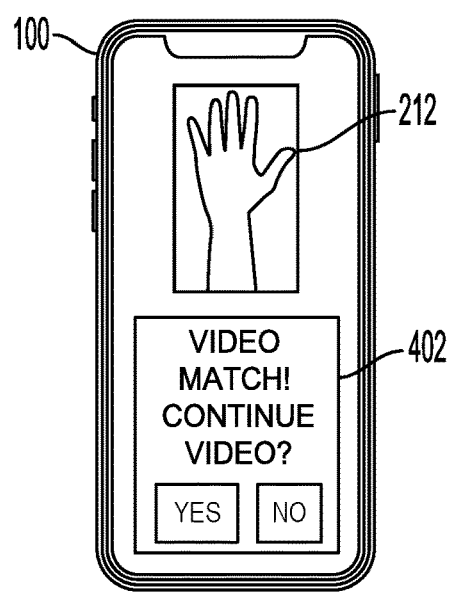
FIG. 4 is an illustration of detecting a video match to a snapshot according to some embodiments of the disclosure.

After detecting the pause command, the device 100 stores the paused video until a match with a new video recording is detected. When a match is determined the user may be prompted to continue the paused video as shown in the example of FIG. 4. FIG. 4 is an illustration of detecting a video match to a snapshot according to some embodiments of the disclosure. The device 100 may detect a matching scene to the snapshot 212, such as by determining the same object exists, the same gesture was made, and/or the same face was detected. The matching scene may be determined from a preview stream of image frames from the camera or determined during an on-going video recording. Upon detecting a match, the device 100 prompts 402 the user as to whether to continue the previously-paused video. In some embodiments, the prompt 402 may include a preview of the previously-paused video. In some embodiments, the prompt 402 may include an option to select one of several previously-paused videos when multiple paused videos match the snapshot 212.

Figure 5:
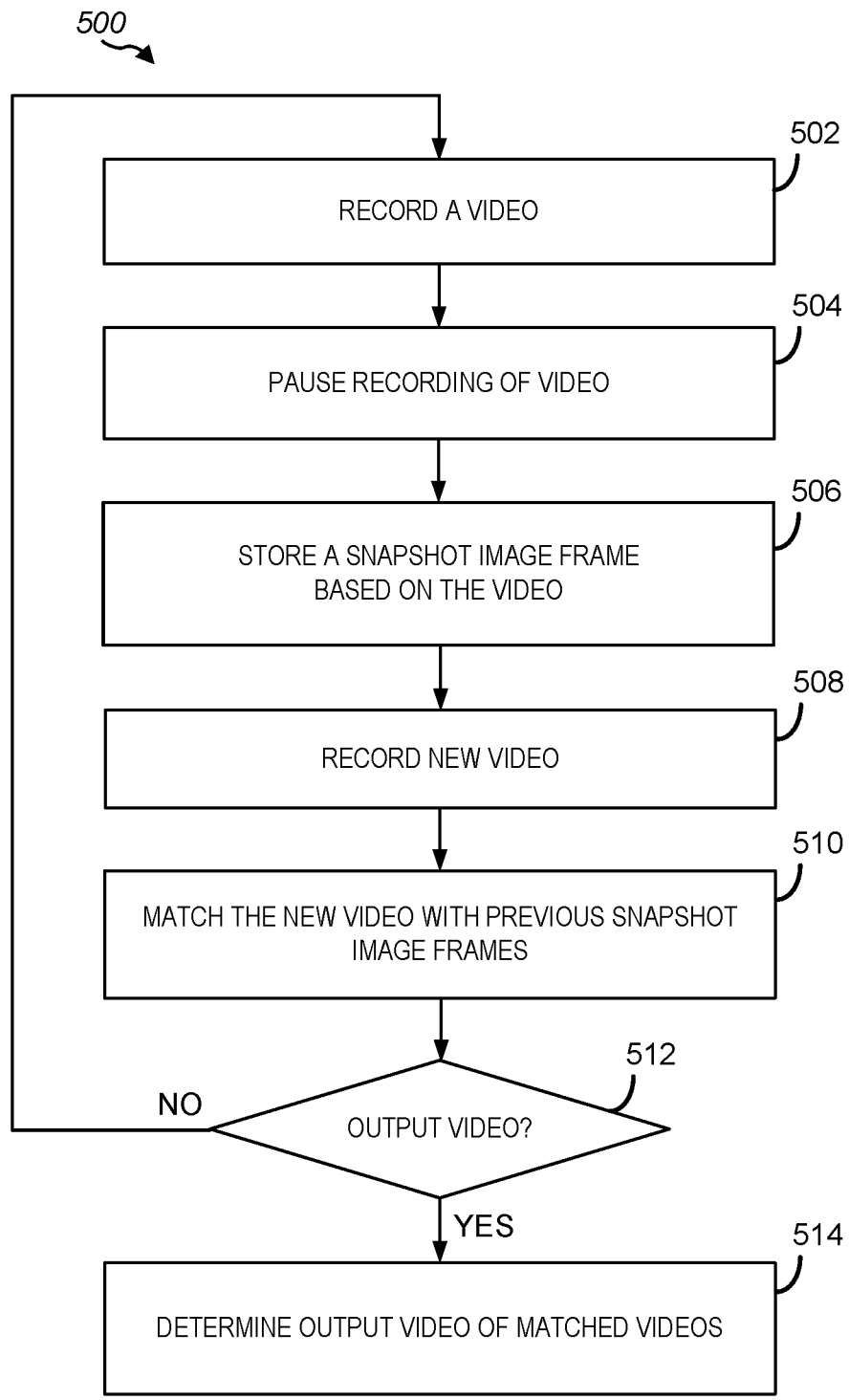
FIG. 5 is a flow chart illustrating a method of assembling matched videos that were previously paused according to some embodiments of the disclosure.

Example processing steps for pausing and continuing videos at a later time is shown in FIG. 5. FIG. 5 is a flow chart illustrating a method of assembling matched videos that were previously paused according to some embodiments of the disclosure. A method 500 includes recording a first video at block 502. The video may be encoded and stored in a gallery of the mobile device or stored uncompressed in a buffer. In some embodiments, the first recording of a video may be received, such as from another wireless device, from a storage device, from cloud storage, as an attachment to an email message, and/or as an attachment to a text or chat message. At block 504, the video recording of the first video is paused. The pause may be based on user input, such as by the user controlling an input to the image capture device to capture a certain object, scene, or gesture. The pause may be based on user input directly to the device, such as by pressing a pause button in a camera application recording the first video. The pause may be based on predetermined rules, such as by beginning the recording of first video at block 502 with a rule to capture thirty seconds of video. Upon determining to pause the recording at block 504, a snapshot image frame may be stored and linked with the first video recorded at block 502. The snapshot may include the scene, object, or gesture that caused the pause at block 504 such that the same scene, object, or gesture can be later used to match a new recording to the first video paused at block 504.

A new video may be recorded at block 508, and at block 510 the new video may be matched with previously-paused videos through their linked snapshots. In some embodiments, the new video may be received, such as from another wireless device, from a storage device, from cloud storage, as an attachment to an email message, and/or as an attachment to a text or chat message. The matching may use an artificial intelligence (AI) algorithm to determine similarities between an image frame of the new video and the snapshot. When the similarity is higher than a threshold percentage or score, the user may be prompted with the identification of the one or more matched videos. For example, the user may be prompted when a match is determined between the first video recorded at block 502 and the new video recorded at block 508 through the snapshot stored at block 506. The matching processing at block 510 may include comparing one or more image frames of the new video recorded at block 508 with one or more previously-captured snapshot image frames and/or one or more previously-paused video recordings. For example, a buffer may include multiple paused, unencoded videos that may be matched to the new video at block 510. In some embodiments, the matching at block 510 may be triggered based on a user input, such as a user tapping the display screen of the image capture device.

When a match is determined at block 510, the user prompt may offer to the user to complete the video by combining the previously-paused video with the new view. At block 512, the user is prompted whether to output the combined video. The prompt may include an indication of the match along with a preview of the new video. The prompt may also or alternatively include an indication of the match along with a list of previously-recorded image data (including image data previously recorded by the same device or another device) that are part of the match to allow a user to select one or more of the previously-recorded image data for combining with the new video of block 508. If the user selects not to combine at block 512, the camera application returns to an idle state, from which the user may record a new video by returning to block 502. If the user indicates the paused video is now complete or otherwise desires output of the video, an output video is determined at block 514, which includes image frames from all matched videos.

Figure 6:
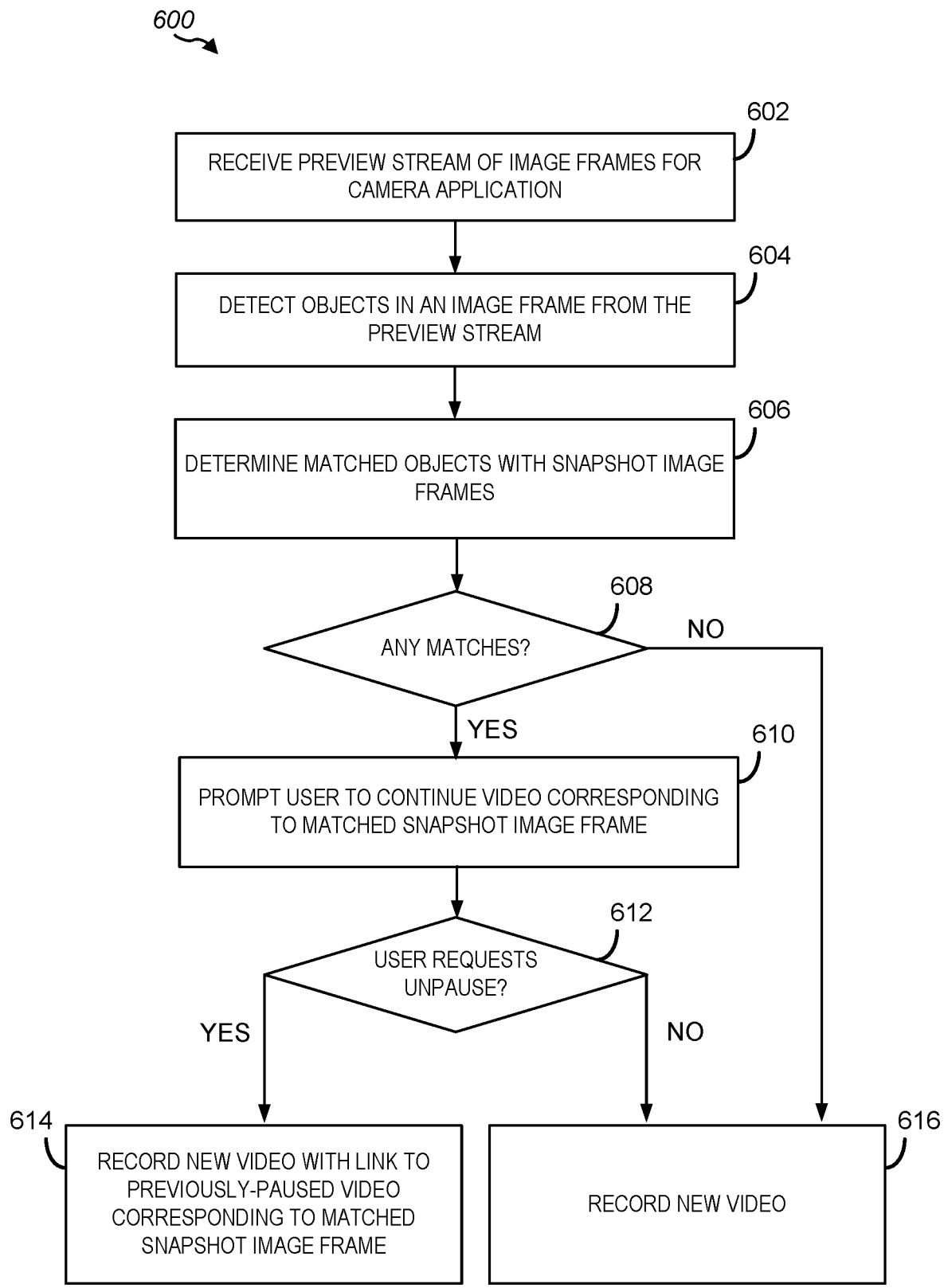
FIG. 6 is a flow chart illustrating a method of detecting video matches according to some embodiments of the disclosure.

The pausing and matching of videos may be determined based on image content in an image frame received from the image sensor. FIG. 6 is a flow chart illustrating a method of detecting video matches according to some embodiments of the disclosure. A method 600 includes the camera application executing on an image capture device receiving, at block 602, a preview stream of image frames. At block 604, the device detects objects in an image frame from the preview stream. A block 606, the device determines if there are matched objects between the image frame in the preview stream detected at block 604 and objects linked with previously-paused videos. The matching process may identify matches by comparing video to identify one or more criteria including identifying at least one of a partial scene match between the first image data and the second image data; identifying common features between the first image frame and the second image frame using an artificial intelligence (AI) algorithm; identifying a face match between the first image data and the second image data; identifying a location match between the first image data and the second image data; identifying a camera settings match between the first image data and the second image data; identifying an object match between the first image data and the second image data; and/or identifying an audio match between the first image data and the second image data.

If no matches are determined at block 608, the method 600 results in recording the new video at block 616 as a normal video recording operation. If matches are determined at block 608, the user is prompted at block 610 whether to continue the video corresponding to the matched snapshot image frame. If the user does not request to unpause the matched video then the method 600 results in recording the new video at block 616 as a normal video recording operation. If the user requests to unpause the matched video then the method 600 results in recording the new video at block 614 with a link to the previously-paused, matched video.

Figure 7:
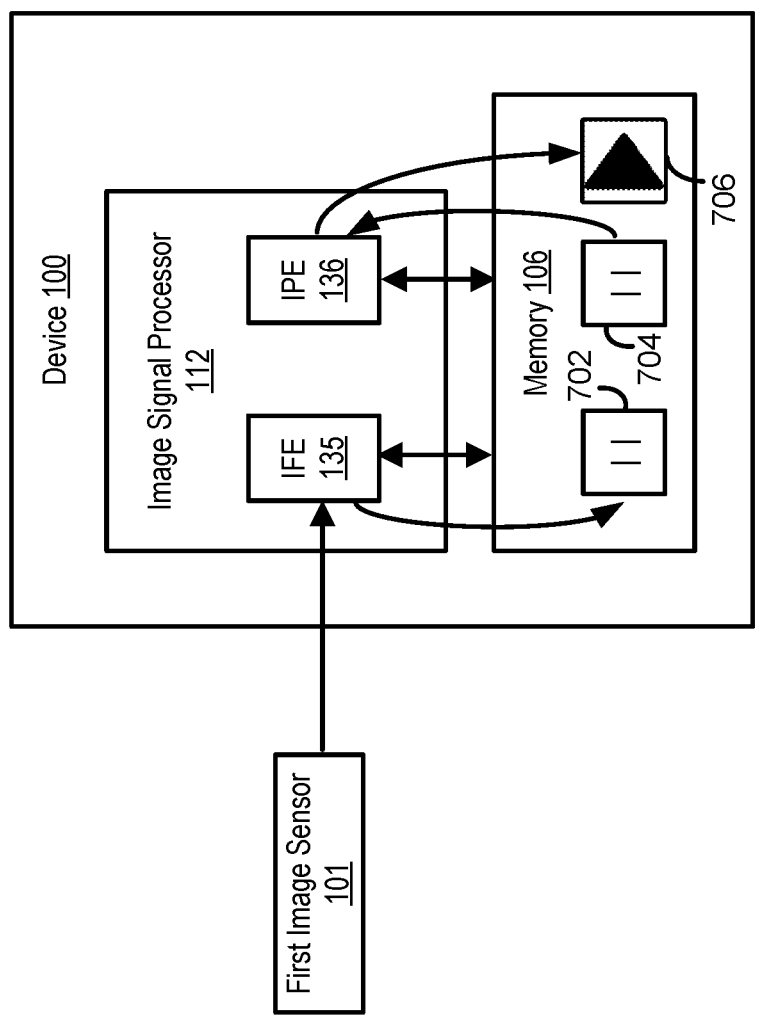
FIG. 7 shows a block diagram of an image capture device illustrating saving of paused videos to a buffer according to some embodiments of the disclosure.

In some embodiments, the paused video may be stored in a buffer from a processing pipeline through an image signal processor as shown in the example data flow of FIG. 7. FIG. 7 shows a block diagram of an image capture device illustrating saving of paused videos to a buffer according to some embodiments of the disclosure. A device 100 may include an image signal processor (ISP) 112 with IFE 135 and IPE 136. The IFE 135 may receive image data from the first image sensor 101 and form image frames in a buffer portion of the memory 106, which may be non-volatile memory, volatile memory, or a combination of non-volatile and volatile memories. When a video recording is paused, the image frames may be stored as a paused video 702 in memory 106. A second video 704 may likewise be stored in memory 106. When videos 702 and 704 are matched, such as through a snapshot frame linked to video 702, the IPE 136 may retrieve the paused videos 702 and 704 from the memory 106. The IPE 136 may perform processing on the videos 702 and 704, such as to combine image frames from the videos 702 and 704, and encoding the combined image frames as an output video 706. The output video 706 may be stored in the memory 106 and/or transmitted to remote storage through a wireless network, such as a 5G NR wireless network.

In one or more aspects, techniques for supporting image processing may include additional aspects, such as any single aspect or any combination of aspects described below or in connection with one or more other processes or devices described elsewhere herein. In a first aspect, supporting image processing may include an apparatus, such as an image capture device, configured to perform operations including determining a match between first image data and second image data; presenting an indication to a user of the match; receiving user input responsive to the indication; and based on determining the match and the user input indicating to combine the first image data and the second image data, determining output image data comprising at least some of the first image data and at least some of the second image data. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the receiving the first image data comprises receiving a series of image frames comprising a video sequence.

In a third aspect, in combination with one or more of the first aspect or the second aspect, the apparatus may be further configured to perform operations including displaying the second image data in a preview, and wherein presenting the indication comprises presenting the indication with the preview.

In a fourth aspect, in combination with one or more of the first aspect through the third aspect, determining the match comprises identifying at least one of a partial scene match between the first image data and the second image data; identifying common features between the first image frame and the second image frame using an artificial intelligence (AI) algorithm; identifying a face match between the first image data and the second image data; identifying a location match between the first image data and the second image data; identifying a camera settings match between the first image data and the second image data; identifying an object match between the first image data and the second image data; or identifying an audio match between the first image data and the second image data.

In a fifth aspect, in combination with one or more of the first aspect through the fourth aspect, presenting the indication to the user of the match comprises presenting a representation of the first image data.

In a sixth aspect, in combination with one or more of the first aspect through the fifth aspect, presenting the indication to the user of the match comprises presenting a representation of a plurality of previously-recorded image data comprising at least some of the first image data; receiving user input comprises receiving a selection of at least one of the plurality of previously-recorded image data to append to the second image data; and determining the output image data comprises appending at least some image data of the selection of the at least one of the plurality of previously-recorded image data with at least some of the second image data.

In a seventh aspect, in combination with one or more of the first aspect through the sixth aspect, determining the match comprises matching a first user gesture appearing in the first image data with a second user gesture appearing in the second image data.

In an eighth aspect, in combination with one or more of the first aspect through the seventh aspect, the apparatus may be further configured to perform operations including storing the first image data by recording the first image data into a buffer, wherein determining the output image data comprises encoding a video file comprising at least some of the first image data and at least some of the second video by retrieving the at least some of the first image data from the buffer.

In a ninth aspect, in combination with one or more of the first aspect through the eighth aspect, determining the output image data comprises encoding the video file by receiving at least some of the second image data.

In a tenth aspect, in combination with one or more of the first aspect through the ninth aspect, an image capture device includes an image sensor, a memory storing processor-readable code; and at least one processor coupled to the memory and to the image sensor, the at least one processor configured to execute the processor-readable code to cause the at least one processor to perform steps comprising determining a match between first image data and second image data; presenting an indication to a user of the match; receiving user input responsive to the indication; and/or based on determining the match and the user input indicating to combine the first image data and the second image data, determining output image data comprising at least some of the first image data and at least some of the second image data.

In an eleventh aspect, in combination with one or more of the first aspect through the tenth aspect, an image capture device may include an artificial intelligence (AI) engine coupled to the processor, wherein determining the match by the processor comprises identifying common features between the first image data and the second image data using the artificial intelligence (AI) engine.

In a twelfth aspect, in combination with one or more of the first aspect through the eleventh aspect, the processor comprises an image signal processor, the image signal processor comprising an image front end (IFE) and an image processing engine (IPE) coupled to the IFE.

In a thirteenth aspect, in combination with one or more of the first aspect through the twelfth aspect, the image signal processor is configured to perform operations comprising recording, by the IFE, the first image data into a buffer portion of the memory from the image sensor; recording, by the IFE, the second image data into the buffer portion of the memory from the image sensor; and wherein determining the output video comprises encoding, by the IPE, a video file comprising the first video and the second video by retrieving the first video from the buffer; and retrieving the second video from the buffer.

In a fourteenth aspect, in combination with one or more of the first aspect through the thirteenth aspect, the image capture device includes a display coupled to the at least one processor, wherein the at least one processor is configured to displaying the second image data in a preview on the display, and wherein presenting the indication comprises presenting the indication with the preview.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   determining, by a processor accessing a memory, a match between first image data stored in the memory and second image data, wherein:
     the first image data includes a first video formed of a plurality of image frames, recorded during a first period of time and paused at an end of the first period of time;
     the second image data includes a second video recorded during a second period of time that is after and temporally separate from the first period of time;
   presenting, by the processor and via a user interface, an indication to a user of the match;
   receiving, by the processor, user input responsive to the indication; and
   based on the determining of the match and the user input, appending, by the processor and to the plurality of image frames of the first video, at least one image frame of the second video as a continuation of the first video, thereby generating an output video.

2. The method of claim 1, further comprising displaying the second image data in a preview, and wherein presenting the indication comprises presenting the indication with the preview.

3. The method of claim 1, wherein determining the match comprises identifying at least one of:
   a partial scene match between the first image data and the second image data;
   common features between the first image data and the second image data using an artificial intelligence (AI) algorithm;
   a face match between the first image data and the second image data;
   a location match between the first image data and the second image data;
   a camera settings match between the first image data and the second image data;
   an object match between the first image data and the second image data; and
   an audio match between the first image data and the second image data.

4. The method of claim 1, wherein presenting the indication to the user of the match comprises presenting a representation of the first image data.

5. The method of claim 1, wherein:
   presenting the indication to the user of the match comprises presenting a representation of a plurality of previously-recorded image data comprising at least some of the first image data;
   receiving the user input comprises receiving a selection of the first image data from the representation of the plurality of previously-recorded image data to which to append to the second image data; and
   the appending is performed based on the selection.

6. The method of claim 1, wherein determining the match comprises matching a first user gesture appearing in the first image data with a second user gesture appearing in the second image data.

7. The method of claim 1, further comprising:
   storing the first image data by recording the first image data into a buffer, wherein the appending comprises retrieving from the buffer at least some of the first image data to which the at least one image frame of the second video is appended.

8. The method of claim 1, further comprising obtaining a stored snapshot that is linked to the first image data, wherein the determining of the match is performed based on the obtained linked snapshot.

9. An apparatus, comprising:
   a memory storing processor-readable code; and
   at least one processor coupled to the memory, the at least one processor configured to execute the processor-readable code to cause the at least one processor to perform steps comprising:
     determining a match between first image data and second image data, wherein:
       the first image data includes a first video formed of a plurality of image frames, recorded during a first period of time and paused at an end of the first period of time;
       the second image data includes a second video recorded during a second period of time that is after and temporally separate from the first period of time;
     presenting an indication to a user of the match;
     receiving user input responsive to the indication; and
     based on the determining of the match and the user input, appending to the plurality of image frames of the first video at least one image frame of the second video as a continuation of the first video, thereby generating an output video.

10. The apparatus of claim 9, wherein the processor-readable code further causes the at least one processor to perform steps comprising:
    displaying the second image data in a preview, and wherein presenting the indication comprises presenting the indication with the preview.

11. The apparatus of claim 9, wherein determining the match comprises identifying at least one of:
    a partial scene match between the first image data and the second image data;
    common features between the first image data and the second image data using an artificial intelligence (AI) algorithm;
    a face match between the first image data and the second image data;
    a location match between the first image data and the second image data;
    a camera settings match between the first image data and the second image data;
    an object match between the first image data and the second image data; and
    an audio match between the first image data and the second image data.

12. The apparatus of claim 9, wherein presenting the indication to the user of the match comprises presenting a representation of the first image data.

13. The apparatus of claim 9, wherein:
presenting the indication to the user of the match comprises presenting a representation of a plurality of previously-recorded image data comprising at least some of the first image data;
receiving the user input comprises receiving a selection of the first image data from the representation of the plurality of previously-recorded image data to which to append to the second image data; and
the appending is performed based on the selection.

14. The apparatus of claim 9, wherein determining the match comprises matching a first user gesture appearing in the first image data with a second user gesture appearing in the second image data.

15. The apparatus of claim 9, wherein the processor-readable code further causes the at least one processor to perform steps comprising:
storing the first image data by recording the first image data into a buffer, wherein the appending comprises retrieving from the buffer at least some of the first image data to which the at least one image frame of the second video is appended.

16. A non-transitory computer-readable medium storing instructions that, when executed by a processor, cause the processor to perform operations comprising:
determining a match between first image data and second image data, wherein:
the first image data includes a first video formed of a plurality of image frames, recorded during a first period of time and paused at an end of the first period of time;
the second image data includes a second video recorded during a second period of time that is after and temporally separate from the first period of time;
presenting an indication to a user of the match;
receiving user input responsive to the indication; and
based on the determining of the match and the user input, appending to the plurality of image frames of the first video at least one image frame of the second video as a continuation of the first video, thereby generating an output video.

17. The non-transitory, computer-readable medium of claim 16, wherein the instructions further cause the processor to perform operations comprising displaying the second image data in a preview, and wherein presenting the indication comprises presenting the indication with the preview.

18. The non-transitory, computer-readable medium of claim 16, wherein determining the match comprises matching a first user gesture appearing in the first image data with a second user gesture appearing in the second image data.

19. The non-transitory, computer-readable medium of claim 16, wherein the instructions further cause the processor to perform operations comprising:
storing the first image data by recording the first image data into a buffer, wherein the appending comprises retrieving from the buffer at least some of the first image data to which the at least one image frame of the second video is appended.

20. The non-transitory, computer-readable medium of claim 16, wherein:
presenting the indication to the user of the match comprises presenting a representation of a plurality of previously-recorded image data comprising at least some of the first image data;
receiving the user input comprises receiving a selection of the first image data from the representation of the plurality of previously-recorded image data to which to append to the second image data; and
the appending is performed based on the selection.

21. An image capture device, comprising:
an image sensor;
a memory storing processor-readable code; and
at least one processor coupled to the memory and to the image sensor, the at least one processor configured to execute the processor-readable code to cause the at least one processor to perform steps comprising:
determining a match between first image data and second image data, wherein:
the first image data includes a first video formed of a plurality of image frames, recorded during a first period of time and paused at an end of the first period of time;
the second image data includes a second video recorded during a second period of time that is after and temporally separate from the first period of time;
presenting an indication to a user of the match;
receiving user input responsive to the indication; and
based on the determining of the match and the user input, appending to the plurality of image frames of the first video at least one image frame of the second video as a continuation of the first video, thereby generating an output video.

22. The image capture device of claim 21, wherein:
determining the match comprises matching a second user gesture in the second image data with a first user gesture in the first image data.

23. The image capture device of claim 21, further comprising:
an artificial intelligence (AI) engine coupled to the processor, wherein determining the match by the processor comprises identifying common features between the first image data and the second image data using the artificial intelligence (AI) engine.

24. The image capture device of claim 21, wherein:
the at least one processor comprises an image signal processor;
the image signal processor comprises:
an image front end (IFE); and
an image processing engine (IPE) coupled to the IFE;
the IFE is configured to record the first image data, obtained from the image sensor, and the second image data, obtained from the image sensor, into a buffer portion of the memory; and
the appending comprises retrieving, by the IPE and from the buffer portion of the memory, at least some of the first image data to which the at least one image frame of the second video is appended.

25. The image capture device of claim 21, further comprising:
a display coupled to the at least one processor, wherein the at least one processor is configured to display the second image data in a preview on the display, and wherein presenting the indication comprises presenting the indication with the preview.

* * * * *